(12) United States Patent
Tsai et al.

(10) Patent No.: US 7,760,510 B2
(45) Date of Patent: Jul. 20, 2010

(54) PORTABLE ELECTRONIC DEVICE EMPLOYING SLIDING MECHANISM

(75) Inventors: Ching-Sen Tsai, Taipei County (TW); Mei-Tsu Tsao, Taipei County (TW)

(73) Assignee: Chi Mei Communication Systems, Inc., Tu-Cheng, Taipei County (TW)

( * ) Notice: Subject to any disclaimer, the term of this patent is extended or adjusted under 35 U.S.C. 154(b) by 65 days.

(21) Appl. No.: 12/173,901

(22) Filed: Jul. 16, 2008

(65) Prior Publication Data

US 2009/0268388 A1 Oct. 29, 2009

(30) Foreign Application Priority Data

Apr. 25, 2008 (CN) .......................... 2008 1 0301309

(51) Int. Cl.
*H05K 7/12* (2006.01)
(52) U.S. Cl. ................. 361/727; 361/679.08; 455/575.4
(58) Field of Classification Search ............ 361/679.08, 361/727; 455/575.4

See application file for complete search history.

(56) References Cited

U.S. PATENT DOCUMENTS

| 6,782,273 | B2* | 8/2004 | Ono et al. ................. 455/550.1 |
| 6,829,451 | B2* | 12/2004 | Ise ................................ 399/90 |
| 2006/0104013 | A1* | 5/2006 | Sakakibara et al. ......... 361/680 |
| 2008/0182634 | A1* | 7/2008 | Cho et al. ................. 455/575.4 |
| 2008/0191824 | A1* | 8/2008 | Yatsu et al. ................. 335/222 |
| 2009/0051658 | A1* | 2/2009 | Frohlund .................... 345/169 |

\* cited by examiner

*Primary Examiner*—Jayprakash N Gandhi
*Assistant Examiner*—Ingrid Wright
(74) *Attorney, Agent, or Firm*—Steven M. Reiss

(57) ABSTRACT

A portable electronic device (100) includes a base (50), a cover (10) and a sliding mechanism (30). The cover is slidably mounted on the base via the sliding mechanism. The sliding mechanism includes a static member (31) fixed on the base, a sliding member (35) slidably mounted on the static member and fixed on the cover, and a linear motor (36) configured for driving the sliding member to slide on the static member. When the static member is electrified, the sliding member is floated by a magnetic repulsive power formed between the static member and the sliding member to slide on the static member without friction.

19 Claims, 7 Drawing Sheets

PORTABLE ELECTRONIC DEVICE EMPLOYING SLIDING MECHANISM

BACKGROUND

1. Field of the Invention

The present invention relates to portable electronic devices, and particularly to a portable electronic devices employing a sliding mechanism.

2. Description of Related Art

Sliding mechanisms are widely used in portable electronic devices, such as mobile phones and personal digital assistants.

Generally, a conventional portable electronic device employing a sliding mechanism includes a base and a cover slidably mounted on the base by the sliding mechanism. The sliding mechanism includes a static member fixed on the base, a sliding member fixed on the cover and at least one resilient member. The sliding member is slidably mounted on the static member, and the resilient member is assembled between the sliding member and the static member. The resilient member has one end fixed on the sliding member and another end fixed on the static member. When the sliding member is pushed to move a predetermined distance on the static member, the resilient member automatically drives the sliding member to slide.

In use, the cover is pushed to slide on the base, the sliding member and the cover can be driven to slide on the static member by the resilient member. However, the resilient member may loose its elasticity after repeatedly used, which decreases fluency of moving the cover and stability of limiting the cover. Additionally, in a conventional sliding mechanism, a sliding member is generally slidably engaged in a static member, thus the sliding member may be interfered by friction when it is driven to slide on the static member.

Therefore, a new portable electronic device is desired in order to overcome the above-described shortcomings.

BRIEF DESCRIPTION OF THE DRAWINGS

Many aspects of the present portable electronic device can be better understood with reference to the following drawings. The components in the various drawings are not necessarily drawn to scale, the emphasis instead being placed upon clearly illustrating the principles of the present portable electronic device. Moreover, in the drawings, like reference numerals designate corresponding parts throughout the figures.

DETAILED DESCRIPTION OF THE EXEMPLARY EMBODIMENT

Figure 1:
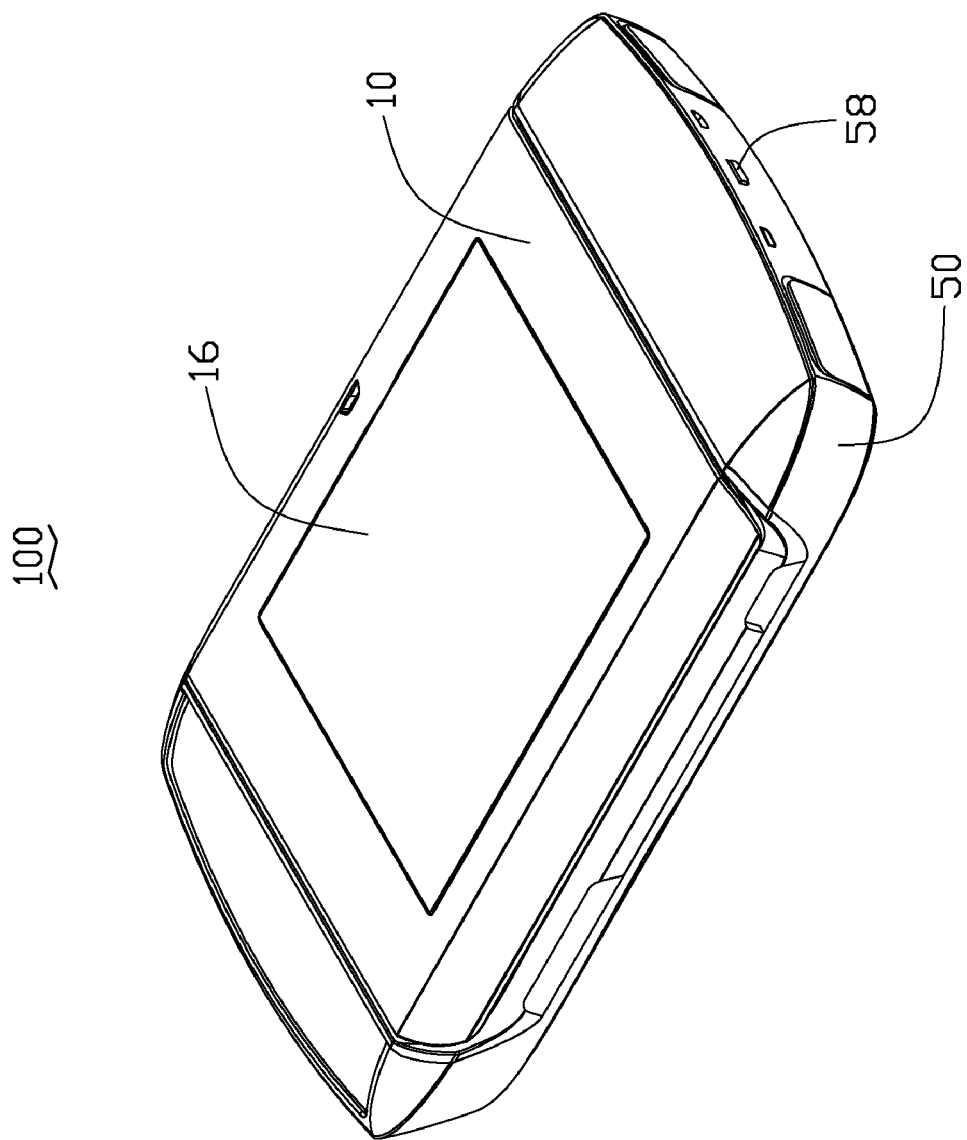
FIG. 1 is a closed, schematic view of a portable electronic device according to an exemplary embodiment.
Figure 2:
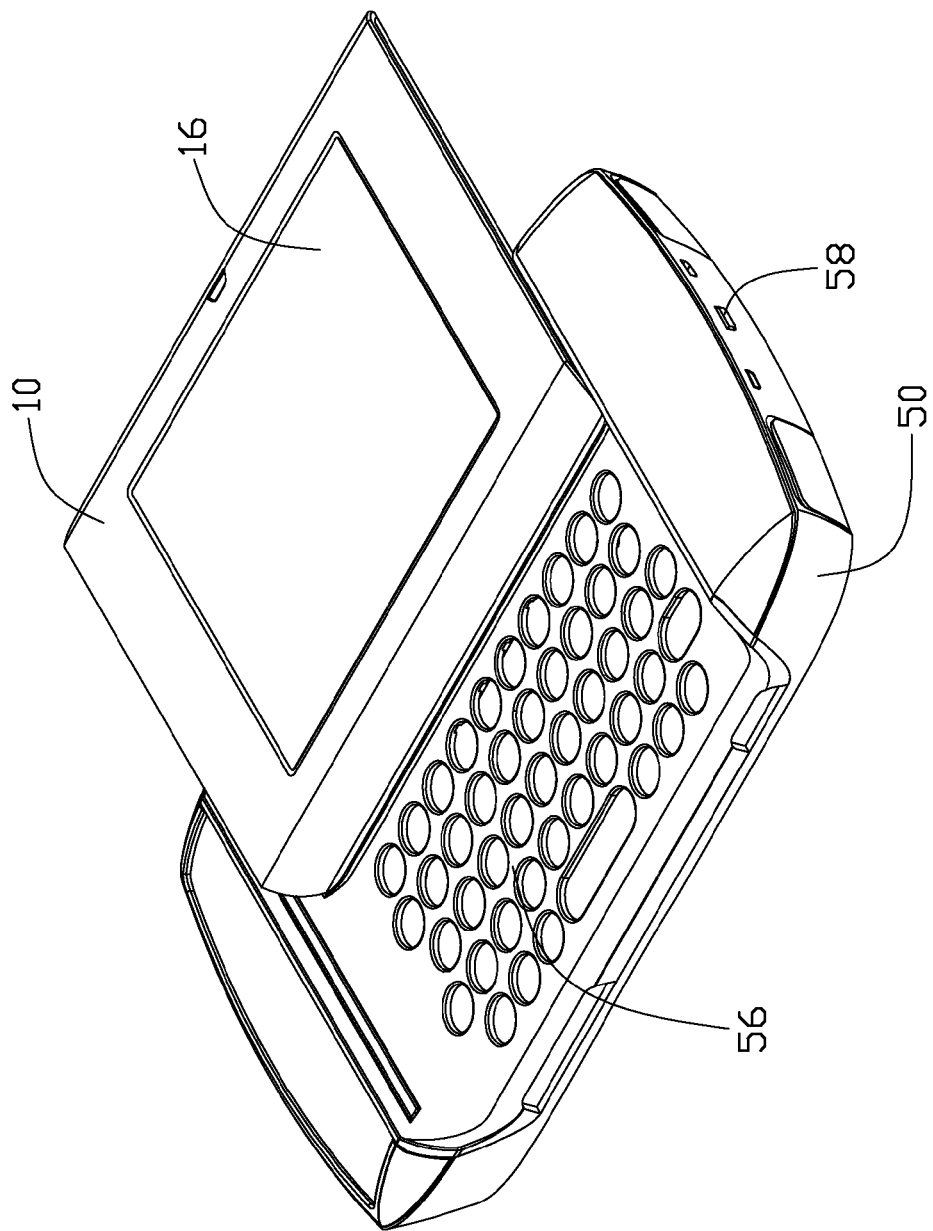
FIG. 2 is an opened, schematic view of the portable electronic device shown in FIG. 1.
Figure 3:
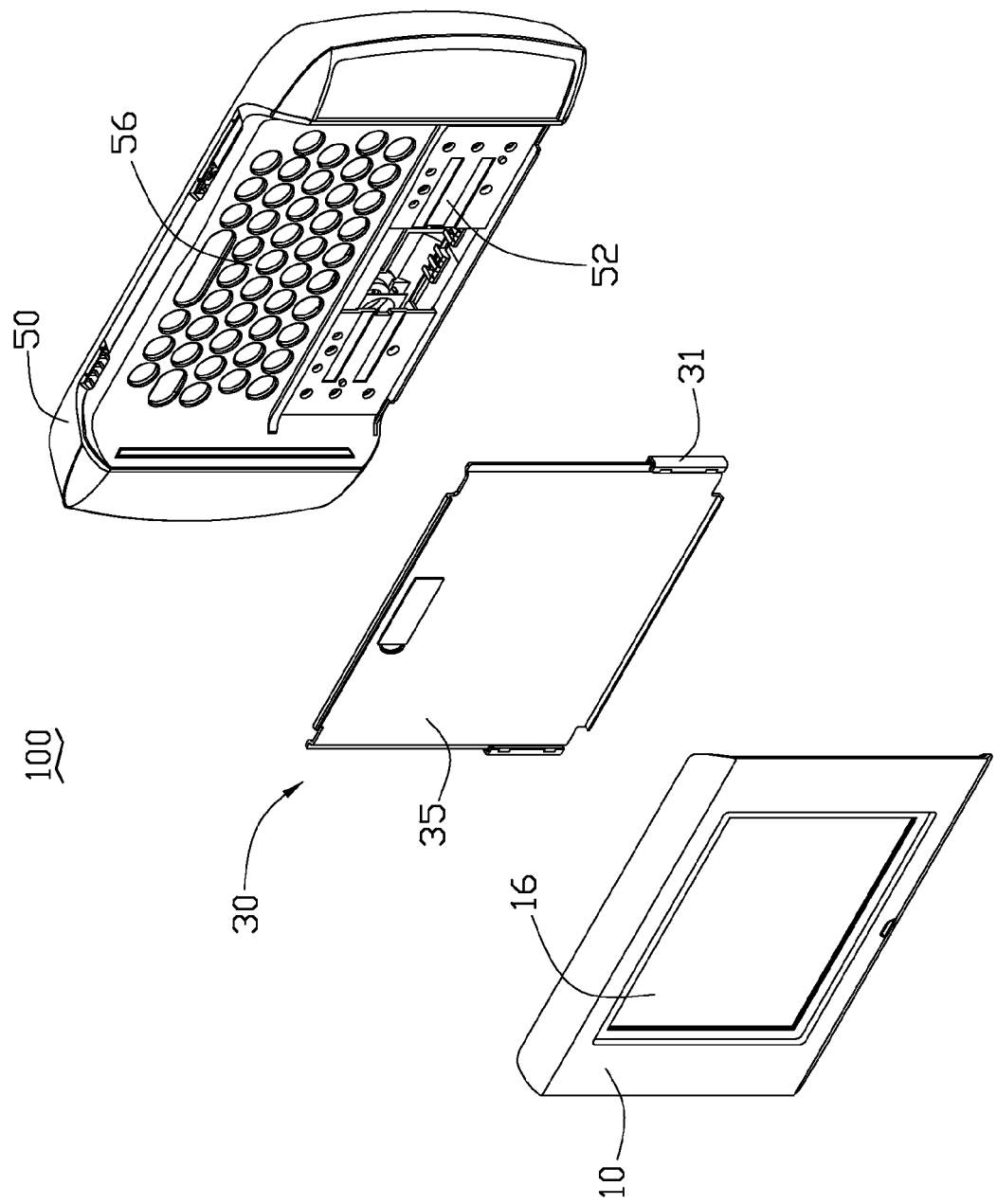
FIG. 3 is a disassembled view of the portable electronic device shown in FIG. 1.

FIG. 1, FIG. 2 and FIG. 3 show an exemplary portable electronic device 100 in accordance with an exemplary embodiment. The portable electronic device 100 can be a mobile phone or a personal digital assistant, etc. The portable electronic device 100 includes a cover 10, a sliding mechanism 30 and a base 50. The cover 10 is slidably mounted on the base 50 by the sliding mechanism 30. The cover 10 includes a display 16 mounted thereon.

Figure 4:
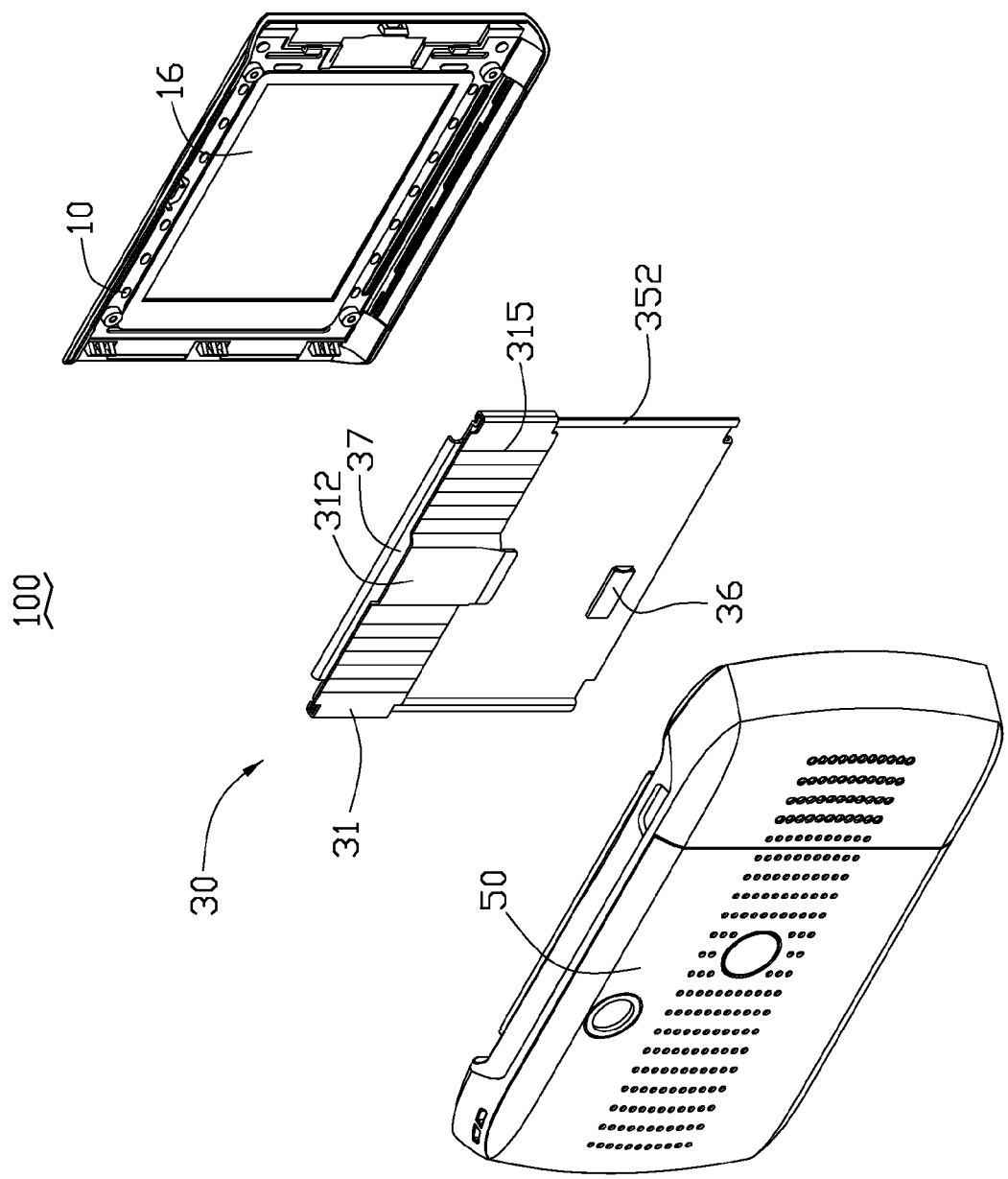
FIG. 4 is similar to FIG. 3, but viewed in another visual angle.

FIG. 4 more clearly shows the sliding mechanism 30. The sliding mechanism 30 includes a static member 31, a sliding member 35 slidably mounted on the static member 31, and a linear motor 36 mounted between the static member 31 and the sliding member 35. The linear motor 36 is mounted on the sliding member 35 and cooperates with the base 50 and static member 31 using a conventional rack and gearing system (not shown for clarity). For example, a gear (not labeled) mounted to the linear motor 36, and racks (not shown) formed on both the base 50 and the static member 31 for meshing with the gear. Thus, the linear motor 36 can drive the sliding member 35 to slide relative to the static member 31.

Figure 5:
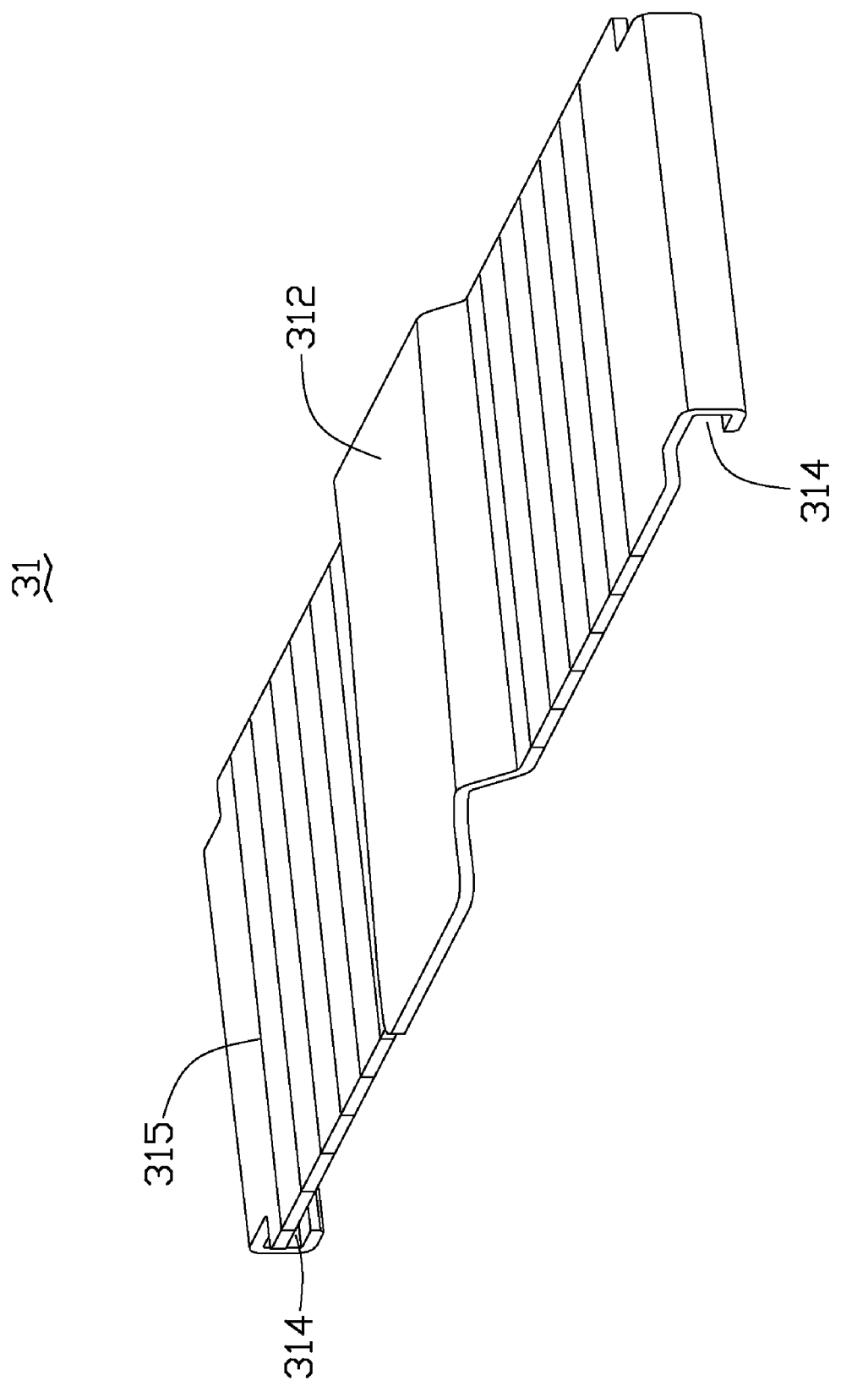
FIG. 5 is a schematic view of a static member of the portable electronic device shown in FIG. 1.

Referring to FIG. 5, the static member 31 is an approximately rectangular plate made of conductive material such as metal. A middle portion of the static member 31 bends to form an approximately U-shaped receiving portion 312. Two opposite sides of the static member 31 are bent to form two sliding grooves 314 facing each other. The receiving portion 312 and the sliding grooves 314 are respectively formed on two opposite surfaces of the static member 31. A winding 315 configured for creating a magnetic field is coiled around the static member 31. When the winding 315 is electrified, the static member 31 creates a magnetic field and becomes an electromagnet.

Figure 6:
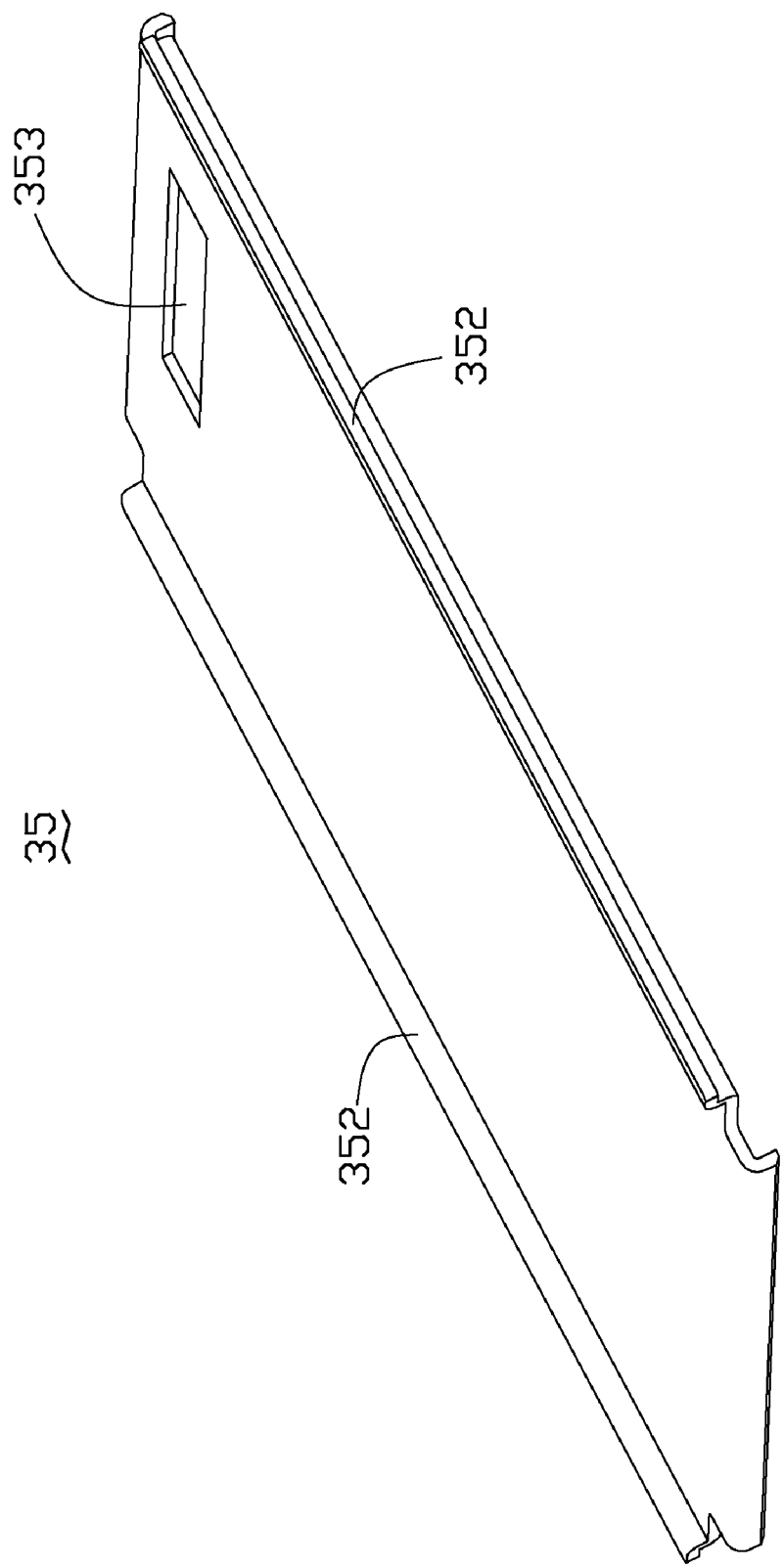
FIG. 6 is a schematic view of a sliding member of the portable electronic device shown in FIG. 1.
Figure 7:
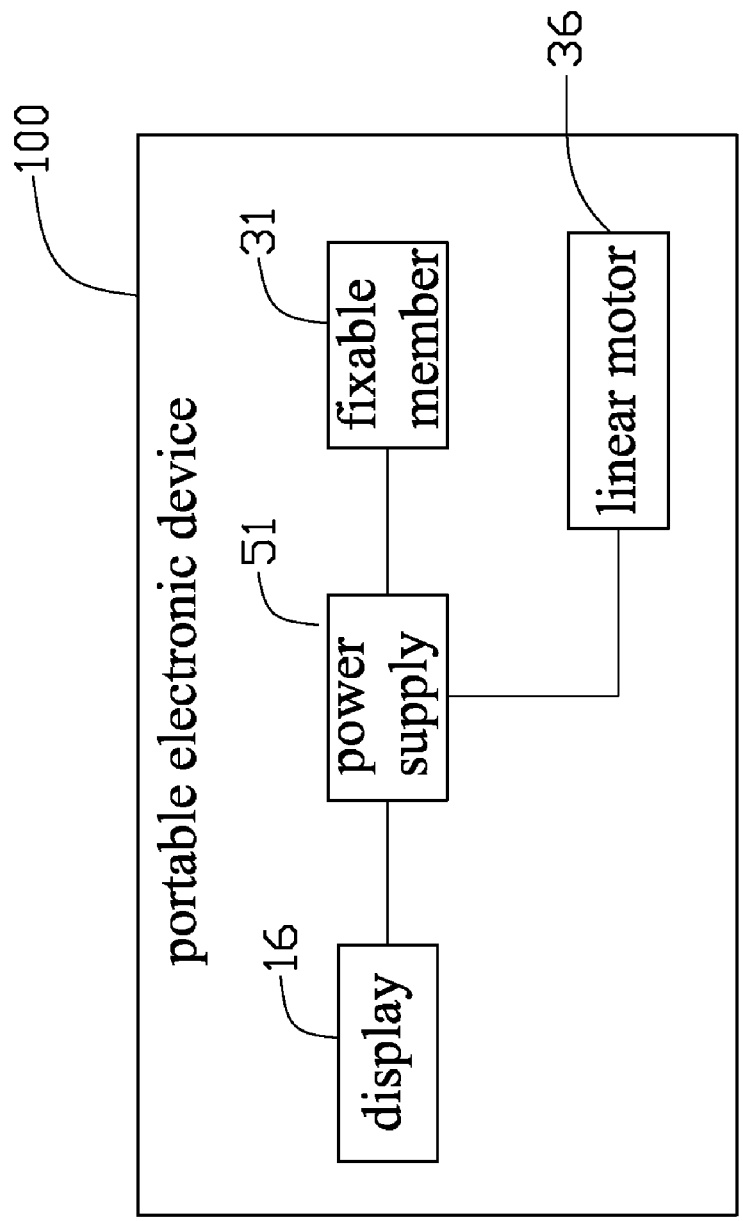
FIG. 7 is a diagram of the portable electronic device shown in FIG. 1.

Referring to FIG. 6, the sliding member 35 is made of ferromagnetic materials, such as ferroalloys. Accordingly, when a magnetic field approaches the sliding member 35, the sliding member 35 can create a magnetic field having a same polarity as that of the approached magnetic field. The sliding member 35 is an approximately rectangular plate and has two sliding rails 352 formed at two opposite sides extending along a same direction perpendicular to the sliding member 35 and bent away from each other. The two sliding rails 352 correspond to the sliding grooves 314 of the static member 31. A thickness of each sliding rail 352 is configured to be less than a width of its corresponding sliding groove 314, thus each sliding rail 352 can be movably received in its corresponding sliding groove 314, (FIG. 3 and FIG. 4). Accordingly, the sliding member 35 can be mounted on the static member 31 and slide along the sliding grooves 314. Furthermore, since the receiving portion 312 and the sliding grooves 314 are formed on opposite surfaces of the static member 31, when the sliding member 35 is mounted on the static member 31 by the sliding grooves 314, a receiving space 37 is then formed between the receiving portion 312 and the sliding member 35 (FIG. 4). The sliding member 35 also includes an aperture 353 for mounting the linear motor 36 defined therein.

The linear motor 36 is mounted on a middle portion of a surface of the sliding member 35, and positioned to align with the receiving portion 312. When the sliding member 35 slides along the sliding grooves 314 on the static member 31, the linear motor 36 can pass through the receiving space 37 without blocking the sliding member 35. Thus, the linear motor 36 can drive the sliding member 35 to slide along the sliding grooves 314.

Referring to FIG. 1, FIG. 2, FIG. 3 and FIG. 7, the base 50 is an approximately rectangular board and is a main housing of the portable electronic device 100. The base 50 includes a power supply 51 such as a battery assembled therein, a receiving groove 52 configured for receiving the static member 31, and a keypad 56 formed adjacent to the receiving groove 52.

The receiving groove 52 is an approximately rectangular groove defined in an inner surface of the base 50 and corresponding to the static member 31. The keypad 56 is configured for mounting key buttons of the portable electronic device 100 thereon. Additionally, a button 58 configured for controlling the power supply 51 to turn on/off can be mounted on an exposed portion of the base 50.

When assembled, the sliding rails 352 are received in the corresponding sliding grooves 314, thus the sliding member 35 is slidably mounted on the static member 31. The static member 31 is received and fixed in the receiving groove 52 of the base 50, and the sliding member 35 is fixed to the cover 10. Thus, the cover 10 is slidably mounted on the base 50 by the sliding mechanism 30. Finally, the display 16, the winding 315 of the static member 31 and the linear motor 36 are electronically connected to the power supply 51 of the base 50.

In use, when the portable electronic device 100 needs to be opened, the power supply 51 is turned on by the button 58 and then supplies an electric potential to the winding 315. The winding 315 is electrified and the static member 31 creates a magnetic field. As a result, the sliding member 35 mounted on the static member 31 also creates a magnetic field having a same polarity as the magnetic filed of the static member 31. Thus, the sliding rails 352 of the sliding member 35 are repulsed to float in the sliding grooves 314 of the static member 31 by the repulsive power between the magnetic fields having the same polarity. In this way, the linear motor 36 can drive the sliding member 35 to slide along the sliding grooves 314 to a predetermined position without friction. Similarly, when the portable electronic device 100 needs to be closed, the winding 315 is electrified to provide repulsive power between the static member 31 and the sliding member 35 to float the sliding rails 352 in the sliding grooves 314, and the linear motor 36 drives the sliding member 35 to return to its initial position to close the portable electronic device 100, again without friction.

In the aforementioned portable electronic device 100, prior art elastic members configured for driving the sliding member 35 can be omitted, and the sliding fluency and limiting stability of the sliding member 30 is not affected by wear of the elastic member. Thus, the sliding mechanism 30 operates better than conventional sliding mechanisms having elastic members. Alternatively, the winding 315 can be mounted on the sliding member 35, and the static member 31 made of magnetic materials. In this way, a same magnetic repulsive power can also be formed between the static member 31 and the sliding member 35. The linear motor 36 can also be mounted in other positions, for example, it can be mounted on the static member 31 and received in the receiving portion 312, and drives the sliding member 35 to slide with the gear thereof and a rack (not shown) formed on the sliding member 35 for meshing with the gear.

It is to be further understood that even though numerous characteristics and advantages of the present embodiments have been set forth in the foregoing description, together with details of structures and functions of various embodiments, the disclosure is illustrative only, and changes may be made in detail, especially in matters of shape, size, and arrangement of parts within the principles of the present invention to the full extent indicated by the broad general meaning of the terms in which the appended claims are expressed.

What is claimed is:

1. A portable electronic device, comprising:
a base;
a cover; and
a sliding mechanism, the cover being slidably mounted on the base by the sliding mechanism; wherein the sliding mechanism includes a static member fixed on the base, a sliding member slidably mounted on the static member and fixed on the cover, and a linear motor configured for driving the sliding member to slide on the static member; when the static member is electrified, the sliding member floats in a magnetic field formed between the static member and the sliding member and can slide on the static member without friction.

2. The portable electronic device as claimed in claim 1, wherein the base includes a power supply mounted therein, the static member and the linear motor electronically connected to the power supply.

3. The portable electronic device as claimed in claim 2, wherein the static member is made of conductive material and includes a winding mounted thereon, the winding being electronically connected to the power supply; such that when the winding is electrified, the static member creates a magnetic field.

4. The portable electronic device as claimed in claim 3, wherein the static member is a rectangular plate, a middle portion of the static member forms a receiving portion, two opposite sides of the static member form two sliding grooves, and the receiving portion and the sliding grooves are formed on opposite surfaces of the static member.

5. The portable electronic device as claimed in claim 4, wherein the sliding member is a rectangular plate made of ferromagnetic material, two opposite sides of the sliding member form sliding rails corresponding to the sliding grooves, and a thickness of each sliding rail is less than a width of its corresponding sliding groove.

6. The portable electronic device as claimed in claim 5, wherein the sliding rails are received in the sliding grooves to slidably mount the sliding member on the static member.

7. The portable electronic device as claimed in claim 6, wherein a receiving space is formed between the receiving portion and the sliding member, and the linear motor is mounted on the sliding member and is positioned to align with the receiving portion of the static member; when the sliding member slides on the static member, the linear motor passes through the receiving space without blocking the sliding member.

8. The portable electronic device as claimed in claim 6, wherein when the winding is electrified, the static member and the sliding member each create a magnetic field having the same polarity, and the sliding rails of the sliding member float in the sliding grooves of the static member due to the magnetic fields.

9. The portable electronic device as claimed in claim 1, wherein the base includes a keypad mounted thereon, and the linear motor is controlled via the keypad.

10. A sliding mechanism, comprising:
a static member being capable of creating a magnetic field when it is electrified; the static member being a rectangular plate made of conductive material; a middle portion of the static member forming a receiving portion, two opposite sides of the static member forming two sliding grooves, the receiving portion and the sliding grooves formed on opposite surfaces of the static member; the static member including a winding mounted thereon, and creating a magnetic field when the winding is electrified;
a sliding member being capable of creating a magnetic field and slidably mounted on the static member; and when the static member is electrified, the sliding member floats and slides on the static member without friction.

11. The sliding mechanism as claimed in claim 10, wherein the sliding member is a rectangular plate made of ferromagnetic material, two opposite sides of the sliding member form sliding rails corresponding to the sliding grooves, and a thickness of each sliding rail is less than a width of its corresponding sliding groove.

12. The sliding mechanism as claimed in claim 11, wherein the sliding rails are engaged with the sliding grooves to slidably mount the sliding member on the static member.

13. The sliding mechanism as claimed in claim 12, wherein when the winding is electrified, the static member and the sliding member create magnetic fields having the same polarity, and the sliding rails of the sliding member float in the sliding grooves of the static member due to the magnetic fields.

14. A sliding mechanism, comprising:
- a static member being capable of creating a magnetic field when it is electrified; the static member being a plate, two opposite sides of the static member forming two sliding grooves; and
- a sliding member being capable of creating a magnetic field; the sliding member being a plate, two opposite sides of the sliding member forming sliding rails corresponding to the sliding grooves, the sliding rails engaged with the sliding grooves to slidably mount the sliding member on the static member; wherein the sliding member is floated and slid on the static member without friction due to magnetic fields when the static member is electrified.

15. The sliding mechanism as claimed in claim 14, wherein the static member is made of conductive material and includes a winding mounted thereon; when the winding is electrified, the static member creates a magnetic field.

16. The sliding mechanism as claimed in claim 14, wherein the static member is a rectangular plate, a middle portion of the static member forms a receiving portion, and the receiving portion and the sliding grooves are formed on opposite surfaces of the static member.

17. The sliding mechanism as claimed in claim 14, wherein the sliding member is a rectangular plate made of ferromagnetic material.

18. The sliding mechanism as claimed in claim 14, wherein a thickness of each sliding rail is less than a width of its corresponding sliding groove.

19. The sliding mechanism as claimed in claim 14, wherein when the winding is electrified, the static member and the sliding member create magnetic fields having the same polarity, and the sliding rails of the sliding member float in the sliding grooves of the static member due to the magnetic fields.

* * * * *